Jan. 4, 1966  L. T. KINCANNON  3,227,007
CHAIN SAW SHARPENER
Filed Sept. 27, 1963

INVENTOR.
LEO T. KINCANNON
BY
Wheeler, Wheeler & Wheeler
ATTORNEYS.

United States Patent Office 3,227,007
Patented Jan. 4, 1966

3,227,007
CHAIN SAW SHARPENER
Leo T. Kincannon, Milwaukee, Wis., assignor to Outboard Marine Corporation, Waukegan, Ill., a corporation of Delaware
Filed Sept. 27, 1963, Ser. No. 312,033
10 Claims. (Cl. 76—31)

The invention relates generally to devices for sharpening chain saws and particularly to devices for guiding reciprocatory movement of a file employed to sharpen the teeth of the chain saw.

The invention has for its principal object the provision of a device which is clamped to the cutter bar of a chain saw and which facilitates sharpening of all the cutting links of the saw chain supported by the cutter bar without removal or relocation of the device relative to the cutter bar. A device in accordance with the invention comprises a frame which includes means for clamping the frame to the cutter bar after proper location of the frame relative to the cutter bar and means for clamping the cutting links to be sharpened against the cutter bar.

In the preferred embodiment, the cutting link clamping means also functions in co-operation with a gage member in assisting to properly locate the frame relative to the cutter bar before clamping thereof to the cutter bar. The preferred embodiment also incorporates a resilient member which is engageable with the rear of the cutting links to be sharpened to assist in locating such links in proper position relative to the length of the cutter bar and, therefore, to the file guiding means. In order to facilitate sharpening of all of the cutting links without removal or unclamping of the frame relative to the cutter bar, the resilient member is adapted to permit passage of the saw chain when the chain is moved forwardly along the cutter bar.

Other objects and advantages of the invention will become known by reference to the following description and accompanying drawings wherein FIGURE 1 is a fragmentary view, partially broken away and sectioned, of a device constructed in accordance with the invention and mounted on the cutter bar of a chain saw;

Figure 1:
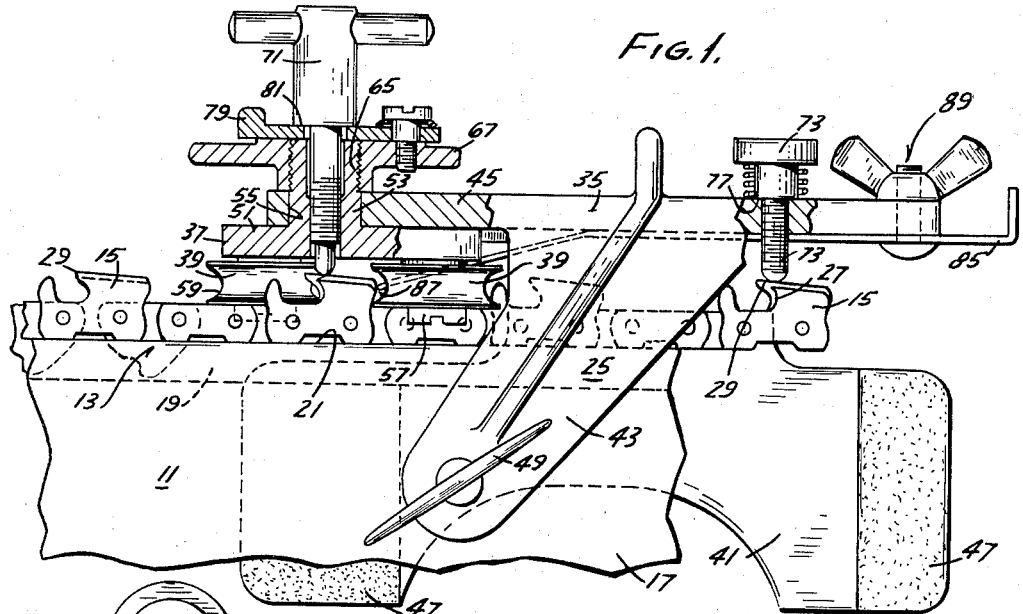
Figure 2:
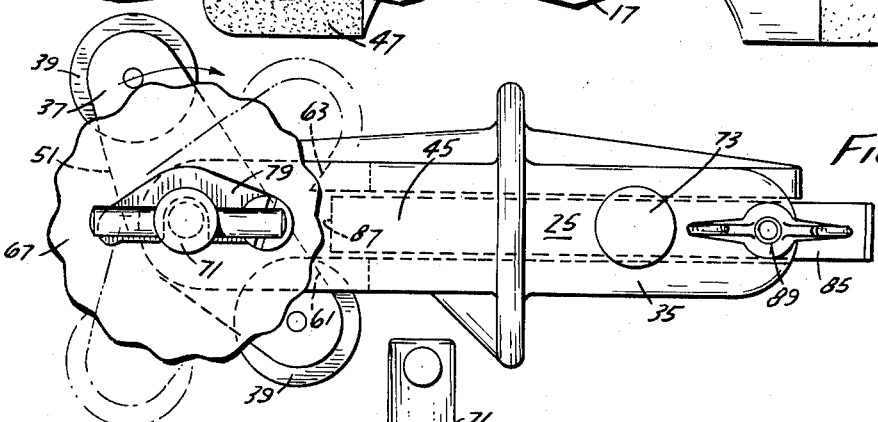
FIGURE 2 is a top plan view of the sharpening device shown in FIGURE 1.
Figure 3:
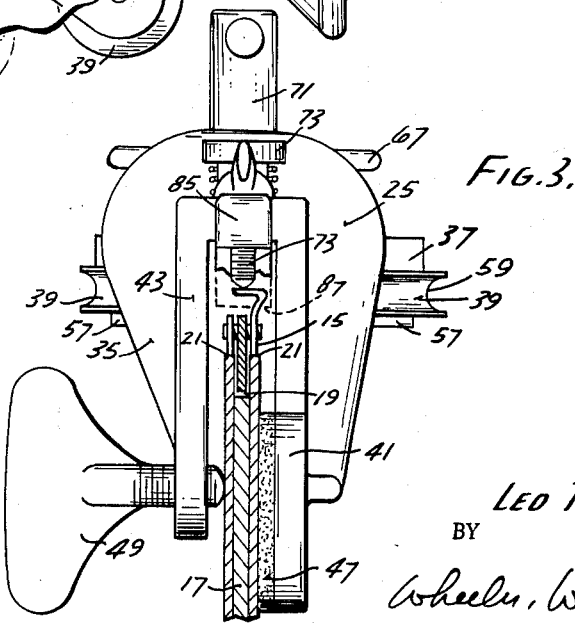
FIGURE 3 is an end view, partially broken away and partially in section, of the device and the cutter bar shown in FIGURE 1.

Shown in the drawings is a fragmentary part of a chain saw 11 including a saw chain 13 comprised of a plurality of articulated cutting links 15 and a cutter bar 17 having a peripheral groove 19 which receives part of the saw chain 13 and which is conventionally defined by a pair of spaced edges 21 supporting the links of the chain. Shown clamped on the cutter bar 17 is a device or sharpener 25 particularly adapted for assisting in the sharpening of a chain such as the saw chain 13 which includes alternate right and left cutting links 15 each incorporating a cylindrically beveled surface 27 extending about an axis located at an angle relative to the path of travel of the saw chain and terminating in a cutting edge 29. An example of such a cutting links is more fully disclosed in United States Patent No. 3,050,094.

The sharpener includes a main frame 35 which supports file guiding means in the form of a subframe 37 carrying a pair of rollers 39, together with means for locating the main frame 35 relative to the cutter bar 17 with the rollers 39 in proper position relative to the surface 27 to be sharpened, means for securing the main frame 35 to the cutter bar in said proper position, and means for clamping the cutting link to be sharpened against the cutter bar.

More particularly, the main frame 35 is generally of U-shaped and includes a pair of spaced legs 41 and 43 connected by a web 45. The leg 41 is provided with two spaced blocks 47 of relatively hard friction material adapted to engage one face of the cutter bar 17. The other leg 43 is provided with clamping means 49 engageable with the other face of the cutter bar for clamping the sharpener 25 to the cutter bar 17 in straddling relation thereto.

The subframe 37 comprises a bar like member 51 having a centrally located cylindrical hub or stud 53 which projects through a mating aperture 55 in one end of the main frame 35 to permit swinging of the subframe 37 relative to the main frame. The rollers 39 are rotatably carried in spaced relation on opposite sides of the stud 53 by suitable means such as the shouldered bolts 57 and are preferably constructed of wear resistant material, such as nylon. Each roller 39 is also preferably constructed with a circumferentially extending arcuate groove 59 defined by a radius corresponding to the radius of the surface to be sharpened and therefore to the size of the file to be used.

Projecting from the underside of the web 45 are a pair of stops 61 and 63 which are located in the path of swinging movement of the subframe 37 and which are positioned to establish the subframe in either of two positions of angular relation with respect to the main frame corresponding to the angular relation between the path of travel of the saw chain and the surfaces to be sharpened on each of a left and right hand cutting link.

In order to releasably secure the subframe 37 in position against either of the stops 61 and 63, means are provided for clamping the subframe 37 relative to the main frame 35. In the disclosed construction, such means takes the form of a threaded portion 65 on the upper end of the stud 53 and a hand nut 67 which is threadedly received on the stud 53 to enable clamping of the subframe against the web 45 of the main frame 35.

The means for locating the sharpener in proper position relative to the links to be sharpened and, therefore, to the cutter bar, comprises a pair of shouldered screws 71 and 73 adapted to contact spaced cutting links 15 of the chain 13. More particularly, the screw 73 is threadedly engaged in a hole adjacent to the end of the web 45 remote from the subframe 37 and, when the shoulder 77 thereof is flush with the top of the web, the screw 73 projects beyond the underside of the web for engagement with the outer surface of a cutting link 15 at a distance which will properly locate the main frame 35 relative to the saw chain 13.

The other locating screw 71 extends centrally in threaded engagement through the hub 53 of the subframe 37 for engagement with the outer surface of the particular link to be sharpened. Swingably mounted on the top of the hand nut 67 is a gage 79 which is movable relative to a position between the top of the hub 53 and the shoulder 81 of the screw 71. When the subframe 37 is clamped to the main frame 35 and when the gage 79 is in engagement with each of the shoulder 81 and the top of the hub 53, the lower end of the screw projects below the bottom of the subframe at a proper distance for engagement with the link to be sharpened so as to locate the axis of the peripheral roller grooves 59 coplanar with the axis of the surface to be sharpened.

While the screws 71 and 73 serve to locate the main frame 35 at the proper distance above the cutting links 15, a gage in the form of a blade 85 of spring material serves to assist in locating the cutting links 15 in the proper position relative to the length of the cutter bar 17 and, therefore, relative to the sharpener 25. In this connection, the spring blade 85 is formed so as to extend downwardly from the undersurface of the web 45 into a position for engagement of the end 87 thereof with the rear of the teeth or links to be sharpened. As the distance from the rear of the cutting link to the surface to be sharpened will vary, depending upon the number of previous sharpenings, means indicated at 89 are provided for adjustably locating the blade longitudinally with respect to the web.

In use, the subframe 37 is first clamped to the main frame 35 by tightening the hand nut 67. The gage 79 is then swung underneath the shoulder 81 on the screw 71 and the screw is tightened against the gage. In addition, the other screw 73 is also positioned with its shoulder 77 in flush engagement with the top of the web 45. The sharpener 25 is then placed in straddling relation to the cutter bar 17 with the ends of the bolts engaging the top surface of spaced cutting links 15 at points adjacent to the cutting edges thereof. When the sharpener is thus positioned, the clamp 49 is tightened to releasably clamp the sharpener 25 to the cutter bar 11. Assuming that the surface to be sharpened is properly positioned lengthwise of the cutter bar and relative to the sharpener, the spring blade 85 is then shifted longitudinally so as to engage its end 87 with the rearward end of the cutting link engaged by the screw 71.

After the sharpener 25 is clamped to the cutter bar 17, the screw 71 is threaded upwardly to disengage the saw chain and the gage 79 is swung out from between the hand nut 67 and the screw 71. After positioning and clamping of the subframe 37 in parallel relation to the surface to be sharpened, the screw 71 is again threaded through the subframe to clamp the tooth or link to be sharpened against the edges 21 on the periphery of the cutter bar 17. The link to be sharpened, the sharpener 25, and the cutter bar 17 are now rigid with respect to each other and the cutting link can now be sharpened by reciprocating a file guided by the grooves 59 in the rollers 39.

When it is desired to sharpen another link or tooth, the screw 71 is backed off and, in the case of a saw chain having alternate right and left cutting links, the saw chain is advanced two cutting links. During advancement of the saw chain, the resilient nature of the spring blade 85 permits travel thereby of the cutting links 15. When the next cutting link to be sharpened is located with its rearward end in engagement with the end 87 of the spring blade 85, the screw 71 is again threaded through the subframe 37 to clamp the cutting link to be sharpened against the cutter bar. The cutting links which have been passed over can be readily sharpened without disconnecting the sharpener 25 from the cutter bar 17 by loosening the hand nut 67 to permit shifting of the subframe 37 into position in parallel relation to the surfaces to be sharpened of the other cutting links and by clamping the subframe in this position.

Various of the features of the invention are set forth in the following claims.

What is claimed is:

1. A device adapted to be mounted on the cutter bar of a chain saw for assisting in sharpening the cutting links of the saw chain supported by the cutter bar, said device comprising a frame having thereon a pair of spaced means for guiding movement of a file relative to a cutting link to be sharpened, means for locating said frame relative to the saw chain in a position so that said file guiding means is located in position for proper guidance of the file relative to the cutting link to be sharpened, means for clamping said frame to the cutter bar with said frame in said position, means for engaging the cutting link to be sharpened for clamping thereof against the cutter bar, a spring blade carried by said frame and extending in a direction longitudinally of the cutter bar when said device is clamped to the cutter bar in said position and having an end adapted for engagement with the cutting link to be sharpened at the end thereof remote from the surface thereof to be sharpened, and means for adjustably positioning said spring blade relative to said frame in said direction.

2. A device adapted to be mounted on the cutter bar of a chain saw for assisting in sharpening the cutting links of the saw chain supported by the cutter bar, said device comprising a frame having thereon means defining a circular aperture, a subframe having a hub extending rotatably in said aperture, means for clamping said subframe relative to said frame, a pair of spaced means on said subframe for guiding movement of a file relative to a cutting link to be sharpened, means for locating said frame relative to the saw chain in a position so that said file guiding means is located in position for proper guidance of the file relative to the cutting link to be sharpened, means for clamping said frame to the cutter bar with said frame in said position, and means for engaging the cutting link to be sharpened for clamping thereof against the cutter bar.

3. A device adapted to be mounted on the cutter bar of a chain saw for assisting in sharpening the cutting links of a saw chain supported by the cutter bar, said device comprising a frame having thereon a pair of spaced means for guiding movement of a file relative to a cutting link to be sharpened, means for locating said frame relative to the saw chain in a position so that said file guiding means is located in position for proper guidance of the file relative to the cutting link to be sharpened, said frame locating means including spaced first and second screws each threadedly engaged with said frame and having ends adapted for engagement with spaced cutting links of the saw chain, means for clamping said frame to the cutter bar with said frame in said position, and means on said frame for engaging the cutting link to be sharpened for clamping thereof against the cutter bar.

4. A device adapted to be mounted on the cutter bar of a chain saw for assisting in sharpening the cutting links of a saw chain supported by the cutter bar, said device comprising a U-shaped frame including a web having a circular aperture therein and a pair of spaced legs, a subframe having a hub extending rotatably in said aperture, means engaging said hub and engageable with said web for clamping said subframe relative to said frame, a pair of spaced means on said subframe for guiding movement of a file relative to a cutting link to be sharpened, means for locating said frame relative to the saw chain in a position so that said file guiding means is located in position for proper guidance of the file relative to the cutting link to be sharpened, said means for locating said frame relative to the saw chain comprising a first screw threadedly extending axially through said hub and adapted for engagement with one part of the saw chain, and a second screw threadedly extending through said web and adapted for engagement with another part of the saw chain, means for clamping said frame to the cutter bar with said frame in said position, and means including said first screw for engaging the saw chain for clamping thereof against the cutter bar.

5. A device in accordance with claim 4 wherein each of said first and second screws include means thereon defining a shoulder and said frame includes means engageable with said shoulders to limit movement of said screws through said frame so as to establish the correct position of said screws for locating said frame relative to the saw chain to be sharpened.

6. A device in accordance with claim 4 including a gage member, means mounting said gage member on said subframe clamping means for movement relative to a position in engagement with the end of said hub, and means on said first screw defining a shoulder engageable with said gage member to obstruct further movement of said first screw inwardly of said hub when said gage is in said position so as to establish the correct position of said first screw for locating said frame relative to the saw chain to be sharpened, and whereby movement of said gage member away from said position permits use of said first screw as said cutting link clamping means.

7. A device adapted to be mounted on the cutter bar of a chain saw for assisting in sharpening the cutting links of a saw chain supported by the cutter bar, said device comprising a frame having thereon a pair of spaced means for guiding movement of a file relative to a cutting link to be sharpened, means for locating said frame relative to the saw chain in a position for proper guidance of the file relative to the cutting link to be sharpened, said frame locating means including spaced first and second screws each threadedly engaged with said frame and having ends adapted for engagement with spaced cutting links of the saw chain, said first screw having thereon a shoulder, means for clamping said frame to the cutter bar with said frame in said position, means on said frame for engaging the saw chain for clamping thereof against the cutter bar, a gage member, means mounting said gage member on said frame for movement relative to a position in interfering relation to the path of travel of said shoulder on said first screw to obstruct further movement of said first screw through said frame when said gage member is in said position so as to establish the correct position of said first screw for locating said frame relative to the saw chain, whereby movement of said gage member away from said position permits use of said first screw as said clamping means.

8. A device adapted to be mounted on the cutter bar of a chain saw for assisting in sharpening the cutting links of a saw chain supported by the cutter bar, said device comprising a frame having thereon a pair of spaced means for guiding movement of a file relative to a cutting link to be sharpened, means for locating said frame relative to the saw chain in a position so that said file guiding means is located in position for proper guidance of the file relative to the cutting link to be sharpened, means for clamping said frame to the cutter bar with said frame in said position, and means for engaging the cutting link to be sharpened for clamping thereof against the cutter bar.

9. A device adapted to be mounted on the cutter bar of a chain saw for assisting in sharpening the cutting links of a saw chain supported by the cutter bar, said device comprising a frame having thereon a pair of spaced means for guiding movement of a file relative to a cutting link to be sharpened, means for locating said frame relative to the saw chain in a position for proper guidance of the file relative to the cutting link to be sharpened, said frame locating means including spaced first and second screws each threadedly engaged with said frame and having ends adapted for engagement with spaced cutting links of the saw chain, means for clamping said frame to the cutter bar with said frame in said position, and means on said frame for engaging the cutting link to be sharpened for clamping thereof against the cutter bar.

10. A device adapted to be mounted on the cutter bar of a chain saw for assisting in sharpening the cutting links of a saw chain supported by the cutter bar, said device comprising a frame having thereon a pair of spaced means for guiding movement of a file relative to a cutting link to be sharpened, means for clamping said frame to the cutter bar, and means for engaging the cutting link to be sharpened for clamping thereof against the cutter bar.

References Cited by the Examiner

UNITED STATES PATENTS

| | | | |
|---|---|---|---|
| 2,171,169 | 8/1939 | Woodbury | 76—31 |
| 2,755,559 | 7/1956 | Pearce | 76—25 X |
| 2,762,241 | 9/1956 | Nielson | 76—31 |
| 2,813,438 | 11/1957 | Paradis et al. | 76—25 |
| 2,818,752 | 1/1958 | Granberg | 76—31 |
| 2,932,993 | 8/1960 | Weatherly et al. | 76—36 |
| 2,932,994 | 8/1960 | Weatherly et al. | 76—40 |
| 3,071,987 | 1/1963 | Kopare | 76—36 |

GRANVILLE Y. CUSTER, Jr., *Primary Examiner.*